United States Patent
Okura

(10) Patent No.: US 9,090,177 B2
(45) Date of Patent: Jul. 28, 2015

(54) UNCERTIFIED BATTERY REPLACEMENT COUNTERMEASURE APPARATUS FOR ELECTRIC VEHICLE

(75) Inventor: Kazuma Okura, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 190 days.

(21) Appl. No.: 13/825,898

(22) PCT Filed: Aug. 9, 2011

(86) PCT No.: PCT/JP2011/068146
§ 371 (c)(1),
(2), (4) Date: Mar. 25, 2013

(87) PCT Pub. No.: WO2012/043068
PCT Pub. Date: Apr. 5, 2012

(65) Prior Publication Data
US 2013/0197734 A1    Aug. 1, 2013

(30) Foreign Application Priority Data

Sep. 28, 2010    (JP) .................................. 2010-216384

(51) Int. Cl.
*B60L 9/00*    (2006.01)
*B60L 11/00*    (2006.01)
(Continued)

(52) U.S. Cl.
CPC ............ *B60L 15/20* (2013.01); *B60L 3/0046* (2013.01); *B60L 7/14* (2013.01); *B60L 11/1803* (2013.01); *B60L 11/1822* (2013.01); *B60L 11/1846* (2013.01); *B60L 11/1868* (2013.01); *B60L 11/1877* (2013.01); *B60L 15/2009* (2013.01); *H01M 10/48* (2013.01);
(Continued)

(58) Field of Classification Search
CPC ........... B60L 11/1803; B60L 11/1822; B60L 11/1846; B60L 11/1868; B60L 11/1877; B60L 15/20; B60L 15/2009; B60L 3/0046; B60L 7/14; B60L 2210/10; B60L 2250/10; B60L 2270/34; H01M 19/48; Y02T 10/642; Y02T 10/7005; Y02T 10/7066; Y02T 10/7072; Y02T 10/7216; Y02T 90/124; Y02T 90/127; Y02T 90/128; Y02T 90/14; Y02T 90/163; Y02T 90/169
USPC .............................. 701/22; 320/104, 106, 109
See application file for complete search history.

(56) References Cited

U.S. PATENT DOCUMENTS 5,664,635 A    9/1997    Koga et al.
7,654,352 B2    2/2010    Takasaki et al.
(Continued)

FOREIGN PATENT DOCUMENTS

JP    8-37703 A    2/1996
JP    8-163709 A    6/1996
(Continued)

*Primary Examiner* — Jason Holloway
*Assistant Examiner* — Rachid Bendidi
(74) *Attorney, Agent, or Firm* — Foley & Lardner LLP

(57) ABSTRACT

An uncertified battery replacement countermeasure apparatus for an electric vehicle including a power source that is driven by an electric power from a replaceable battery, in which it is judged whether or not a post-replacement battery is a battery certified to the electric vehicle, and when it is judged that the post-replacement battery is not the battery certified to the electric vehicle, a power output of the power source is restricted while permitting driving of the power source.

6 Claims, 2 Drawing Sheets

(51) Int. Cl.
  *G05D 1/00* (2006.01)
  *G05D 3/00* (2006.01)
  *G06F 7/00* (2006.01)
  *G06F 17/00* (2006.01)
  *B60L 15/20* (2006.01)
  *B60L 11/18* (2006.01)
  *H01M 10/48* (2006.01)
  *B60L 3/00* (2006.01)
  *B60L 7/14* (2006.01)

(52) U.S. Cl.
  CPC ......... *B60L 2210/10* (2013.01); *B60L 2240/12* (2013.01); *B60L 2240/423* (2013.01); *B60L 2250/10* (2013.01); *B60L 2270/34* (2013.01); *Y02T 10/642* (2013.01); *Y02T 10/7005* (2013.01); *Y02T 10/7066* (2013.01); *Y02T 10/7072* (2013.01); *Y02T 10/7216* (2013.01); *Y02T 90/124* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 2009/0256717 A1* | 10/2009 | Iwai | 340/825 |
| 2010/0138087 A1 | 6/2010 | Takaoka | |
| 2011/0066309 A1* | 3/2011 | Matsuoka et al. | 701/22 |
| 2011/0185196 A1* | 7/2011 | Asano et al. | 713/300 |
| 2012/0049621 A1* | 3/2012 | Shinoda | 307/10.1 |
| 2012/0049785 A1* | 3/2012 | Tanaka | 320/106 |
| 2012/0049786 A1* | 3/2012 | Kurimoto | 320/106 |
| 2012/0049787 A1* | 3/2012 | Kuroiwa | 320/106 |

FOREIGN PATENT DOCUMENTS

| | | |
|---|---|---|
| JP | 2007-116799 A | 5/2007 |
| JP | 2009-137408 A | 6/2009 |
| JP | 2010-173365 A | 8/2010 |
| WO | WO 2008/146577 A1 | 12/2008 |

\* cited by examiner

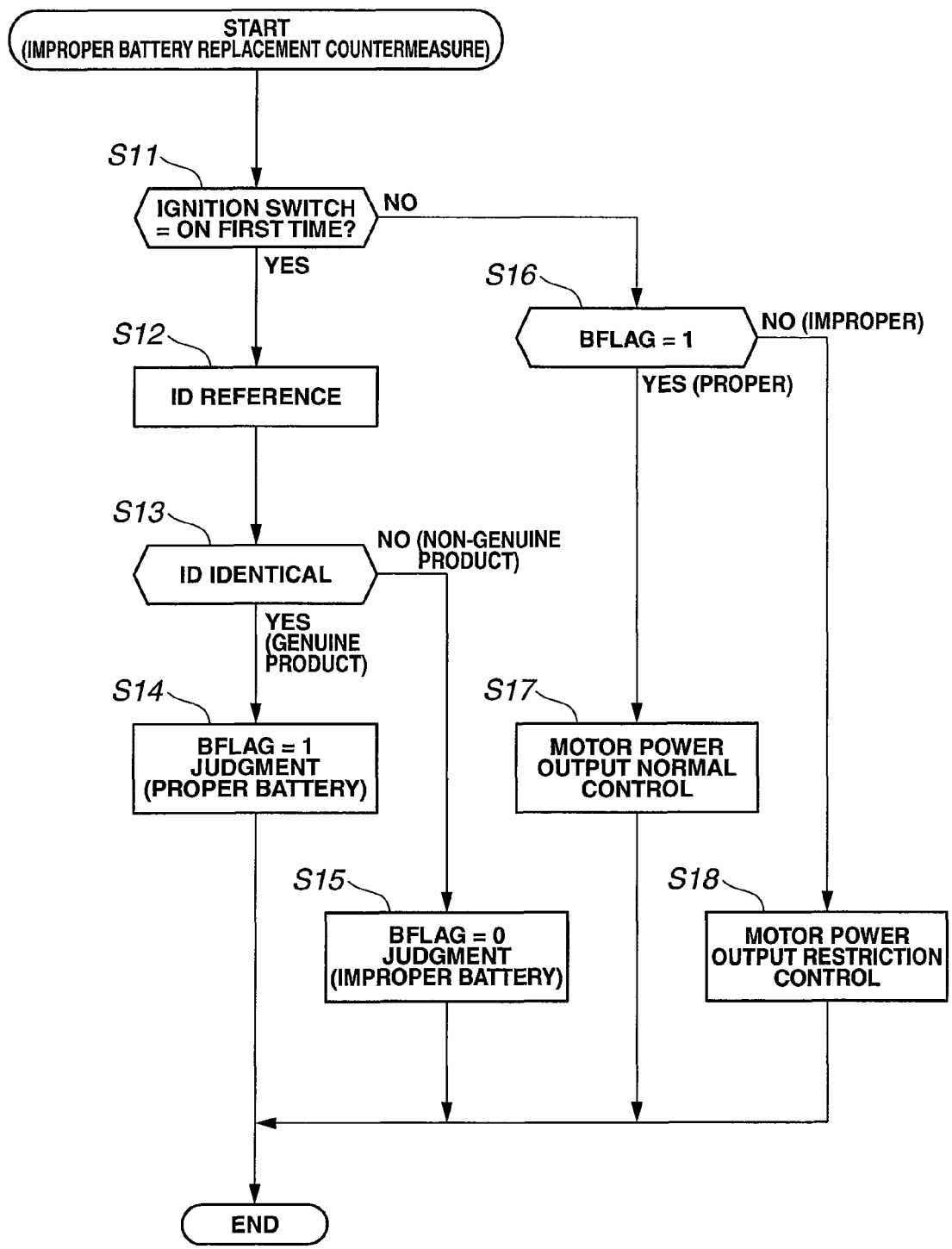

UNCERTIFIED BATTERY REPLACEMENT COUNTERMEASURE APPARATUS FOR ELECTRIC VEHICLE

TECHNICAL FIELD

The present invention relates to a technological countermeasure that is taken in a case where upon replacement with a battery of an electric vehicle that uses at least an electric motor as a part of a power source, for example, an electric automobile using only the electric motor as the power source, a hybrid vehicle that travels using energy supplied from an engine and an electric motor, etc., the battery replaced is an uncertified battery to the electric vehicle.

BACKGROUND ART

An electric vehicle such as an electric automobile and a hybrid vehicle uses at least an electric motor as a part of a power source for travelling. Therefore, as described in Patent Literature 1, the electric vehicle necessitates using a large-capacity battery as a power source of the electric motor.

However, it is necessary to take a long time for charge of such a large-capacity battery which should be carried out when a rate of charge (SOC) of the battery is lowered. For this reason, it will be more convenient if the battery is replaceable with a charged battery such that the electric vehicle can quickly restart the travelling.

Even though an electric vehicle is not such a battery replacement type electric vehicle, the battery must be replaced with a new one when the battery is deteriorated due to long-time use with repeated charge. Accordingly, the electric vehicle is constructed such that replacement with the battery can be carried out as described in Patent Literature 1.

CITATION LIST

Patent Literature

Patent Literature 1: Japanese Patent Application Unexamined Publication No. 2009-137408

SUMMARY OF INVENTION

However, in a case where a post-replacement battery (replaced new battery) is not a genuine product certified to the electric vehicle but an uncertified non-genuine battery, the post-replacement battery will frequently be improper to the electric vehicle from a viewpoint of performance and physical property. In such a case, electrical components to which a power from the improper battery is directly or indirectly supplied, an abnormal load will be exerted on peripheral relating parts of the electrical components, and the like. There is therefore a fear of occurrence of a malfunction in the electrical components or the peripheral relating parts.

In order to eliminate such a fear, in a case where the battery equipped in the electric vehicle is replaced with the uncertified battery, the replacement with the uncertified battery is detected, and the electric vehicle equipped with the uncertified battery is controlled to prevent travelling thereof.

However, since the electric vehicle is completely prohibited from carrying out self-propulsion by this countermeasure, there will be caused the following problems especially in a case where an expensive genuine battery equipped in the electric vehicle is replaced with an uncertified non-genuine battery due to theft that occurs without being noticed during parking. That is, it is difficult to immediately bring the electric vehicle to a repair shop or a battery servicing station and replace the uncertified non-genuine battery with a certified genuine battery again. In addition, the electric vehicle must be displaced by a wrecker. As a result, there are caused problems such as time consuming and troublesome works and an increased cost.

The present invention has been made in view of the above-described circumstances. An object of the present invention is to provide an uncertified battery replacement countermeasure apparatus for an electric vehicle in which in a case where a battery equipped in the electric vehicle is replaced with an uncertified battery, the electric vehicle is held in a state capable of self-propulsion, and a power output of a power source of the electric vehicle is restricted so as to allow a driver of the electric vehicle to recognize an abnormal condition of the electric vehicle, whereby the uncertified battery replacement countermeasure apparatus can eliminate the above-described problems.

In order to achieve the above object, the uncertified battery replacement countermeasure apparatus for an electric vehicle according to the present invention is constructed as follows.

The uncertified battery replacement countermeasure apparatus for an electric vehicle including an electric motor as at least a part of a power source which is driven by an electric power from a replaceable battery, the uncertified battery replacement countermeasure apparatus including: a battery propriety judgment means for judging whether a post-replacement battery is a battery certified to the electric vehicle or a battery uncertified to the electric vehicle; and a power output restricting means for restricting a power output of the power source while permitting driving of the power source when it is judged that the post-replacement battery is the battery uncertified to the electric vehicle by the battery propriety judgment means.

In the uncertified battery replacement countermeasure apparatus for an electric vehicle according to the present invention, in a case where the post-replacement battery is a battery uncertified to the electric vehicle, a power output of the power source is restricted, while permitting driving of the power source. Owing to the restriction of the power output of the power source, the driver of the electric vehicle can recognized that the post-replacement battery is the battery uncertified to the electric vehicle immediately after travelling of the electric vehicle is started.

Although the power output of the power source is restricted, the driving of the power source is kept permitted to thereby allow self-propulsion of the electric vehicle under the restriction of the power output of the power source.

Accordingly, it is possible to bring the electric vehicle equipped with the battery uncertified to the electric vehicle to a repair shop or a battery servicing station and replace the uncertified battery with a certified genuine battery at an early stage. As a result, it is possible to prevent occurrence of malfunction of the electric vehicle due to a long-time use of the uncertified battery.

BRIEF DESCRIPTION OF DRAWINGS

FIG. 3 is a flow chart showing a control program for uncertified battery replacement countermeasure control which is executed by a motor controller as shown in FIG. 2.

DESCRIPTION OF EMBODIMENTS

In the following, an embodiment of the present invention is explained in detail by referring to the accompanying drawings.

<Construction of Embodiment>

Figure 1:
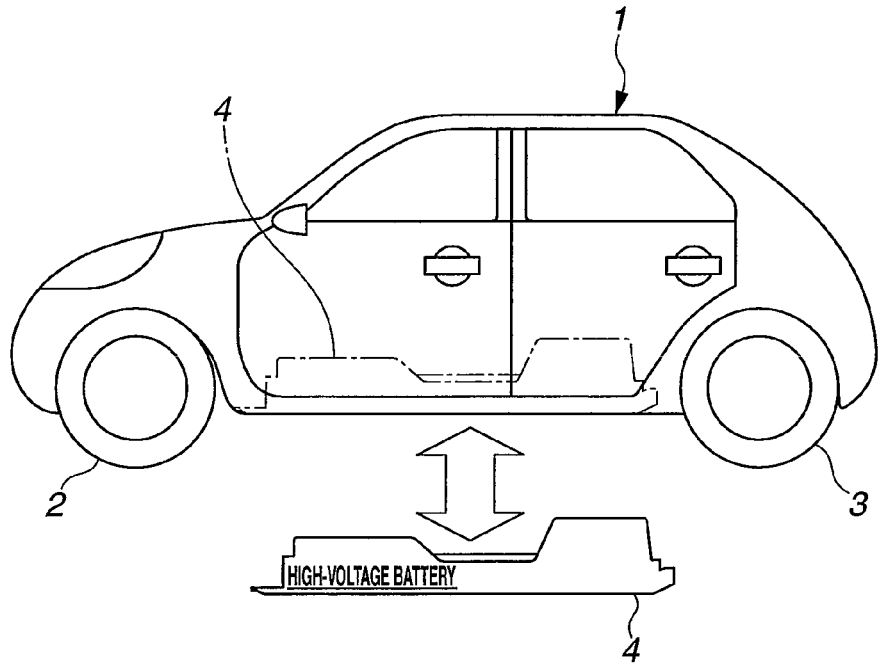
FIG. 1 is a side view of an electric vehicle equipped with an uncertified battery replacement countermeasure apparatus according to an embodiment of the present invention, which shows the condition that a high-voltage battery is detached from the electric vehicle.
Figure 2:
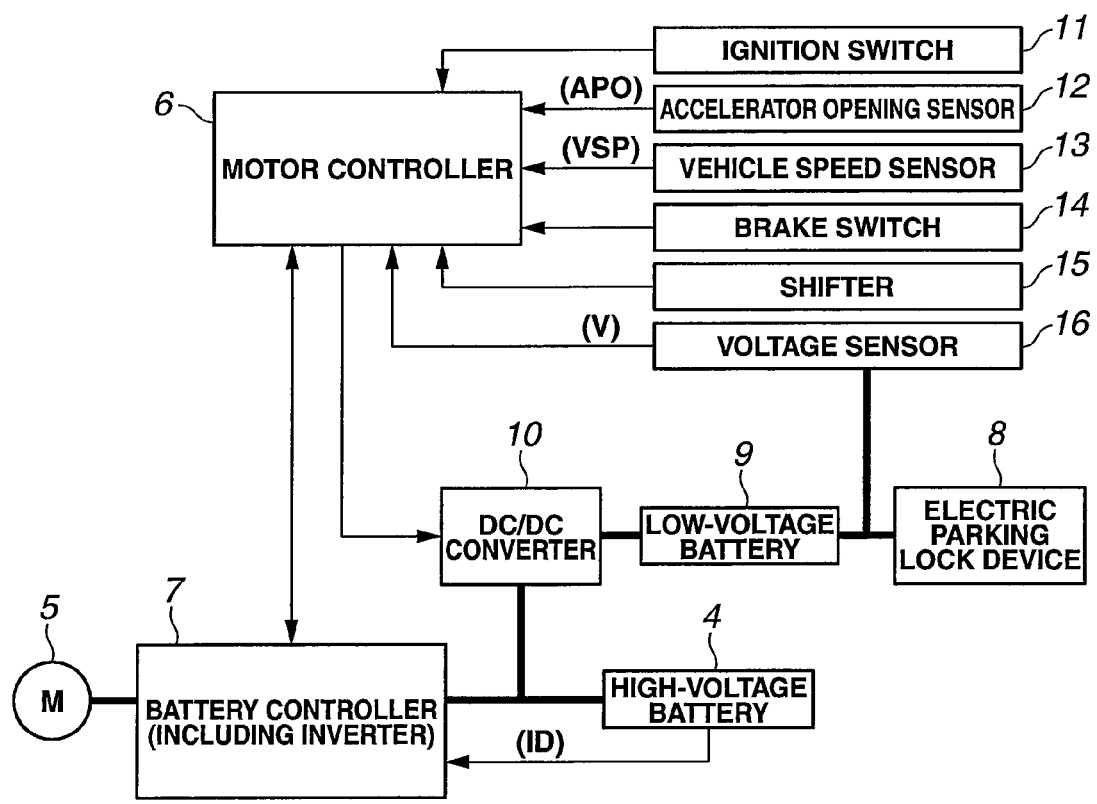
FIG. 2 is a schematic system diagram showing a drive line and a control system of the electric vehicle as shown in FIG. 1 together with an electric parking lock device.

FIG. 1 shows electric vehicle 1 equipped with an uncertified battery replacement countermeasure apparatus according to an embodiment of the present invention. FIG. 2 shows a drive line and a control system of electric vehicle 1 as shown in FIG. 1. The drive line and the control system constitute a travelling drive system of the vehicle.

Electric vehicle 1 shown in FIG. 1 includes left and right front wheels 2 and left and right rear wheels 3 supported thereon in a suspended state, and high-voltage battery 4 as a high voltage power source which is replaceably installed underneath a floor of the vehicle as indicated by arrow.

Electric vehicle 1 is an electric automobile having electric motor 5 only as a power source as shown in FIG. 2. Electric motor 5 is driven by electric power supplied from high-voltage battery 4, and drives left and right front wheels 2 to allow travelling of electric vehicle 1.

Upon controlling drive of electric motor 5, motor controller 6 carries out DC-AC conversion of electric power from high-voltage battery 4 by an inverter in battery controller 7, and supplies the AC power to electric motor 5 under the control of battery controller 7 (including the inverter). Motor controller 6 controls electric motor 5 such that torque of electric motor 5 is consistent with a result of calculation (i.e., target motor torque including 0 in a stopped state of electric vehicle 1, and motor rotational direction for forward/reverse travelling) in motor controller 6.

High-voltage battery 4 is replaced with another high-voltage battery fully charged, as indicated by arrow in FIG. 1 when a state of charge of high-voltage battery 4 is lowered.

However, high-voltage battery 4 may be constructed such that when the state of charge is lowered, high-voltage battery 4 is charged with electric power from an external power source while being kept equipped in electric vehicle 1, and when high-voltage battery 4 is deteriorated due to repeated charging during a long period of time, high-voltage battery 4 is replaced with a new high-voltage battery as indicated by arrow in FIG. 1.

In addition, in a case where the result of calculation (the target motor torque) in motor controller 6 has negative polarity to require a regenerative braking function of electric motor 5, motor controller 6 applies an electric power generating load to electric motor 5 through battery controller (inverter) 7, and allows battery controller (inverter) 7 to make AC-DC conversion of the electric power generated by the regenerative braking function of electric motor 5 and charge high-voltage battery 4 with the resulting DC power.

At this time, battery controller (inverter) 7 controls the charging voltage to high-voltage battery 4, and serves to prevent overcharging of high-voltage battery 4.

Further, in this embodiment, as shown in FIG. 2, electric parking lock device 8 as explained hereinafter is added to the above-described travelling drive system. Electric parking lock device 8 corresponds to an electric auxiliary equipment in the present invention, and includes a parking lock mechanism (not shown) which acts to rotationally lock the front wheel drive line. The parking lock mechanism is similar to that used in an automatic transmission.

However, the parking lock mechanism in this embodiment is operated by an electric parking lock actuator (not shown). The electric parking lock actuator acts in response to parking lock ON/OFF commands from a parking lock controller (not shown). Electric parking lock device 8 shown in FIG. 2 is an electrically operated type (by-wire control type) which is different from a mechanically operated type that is used in an automatic transmission.

Next, an electric power system of electric parking lock device 8 constituted of the parking lock mechanism, the parking lock actuator and the parking lock controller is explained hereinafter.

The electric power system of electric parking lock device 8 includes, for example, low-voltage battery 9 that is a low voltage (for example, 12V) power source, as an auxiliary equipment power source. The parking lock actuator and the parking lock controller of electric parking lock device 8 are supplied with electric power from low-voltage battery 9, thereby being actuated to suitably carry out parking lock of left and right front wheels 2 (see FIG. 1) as the driving wheels through the parking lock mechanism.

Low-voltage battery 9 is connected to a high-voltage circuit between high-voltage battery 4 and electric motor 5 through DC/DC converter 10. Motor controller 6 controls an operation of DC/DC converter 10, thereby charging low-voltage battery 9 with electric power from high-voltage battery 4 so as to be held in an appropriate state of charge thereof.

As shown in FIG. 2, motor controller 6 receives the following signals in order to calculate the target motor torque to be inputted to battery controller (inverter) 7. The signals include ON, OFF signals from ignition switch 11, a signal from accelerator opening sensor 12 that detects accelerator opening degree APO, a signal from vehicle speed sensor 13 that detects vehicle speed VSP, a signal from brake switch 14 that turns ON when a braking operation is carried out, a signal from shifter 15 that is operated when a driver commands a travelling configuration such as reverse (R) range, neutral (N) range, and forward (D) range, a signal from voltage sensor 16 that detects voltage V of low-voltage battery 9. In addition, motor controller 6 receives specific identification code (ID) assigned to individual high-voltage battery 4 through communication with battery controller (inverter) 7.

When a request for starting the travelling drive system is made by turning on ignition switch 11, motor controller 6 calculates a target torque (magnitude including 0 for stop and direction) of electric motor 5 from the accelerator opening degree APO, the vehicle speed VSP, and the brake switch signal for each travelling configuration such as reverse (R) range, neutral (N) range, and forward (D) range which is commanded through shifter 15. Motor controller 6 then transmits a result of the calculation to battery control (inverter) 7, serving for the control of travelling of electric vehicle 1.

On the other hand, electric parking lock device 8 allows front wheels 2 to automatically come into a parking lock state using the electric power from low-voltage battery 9, when electric vehicle 1 is in a stopped state without the driver's intention to start electric vehicle 1.

However, when low-voltage battery 9 is brought into a non-charged state due to a defect in high-voltage battery 4, a capacity (voltage V) indicating a state of charge of low-voltage battery 9 is lowered so that finally, electric parking lock device 8 is rendered inoperable. In this case, electric vehicle 1 cannot come into a parking lock state and thereby cannot attain a parking state with the rotationally locked driving wheels (front wheels 2).

In addition, in electric vehicle 1, a parking brake (not shown) is also constructed as an electrically operated type that is electrically operated by the electric power from low-voltage battery 9. Therefore, when the capacity (voltage V) of low-voltage battery 9 is reduced, electric vehicle 1 cannot attain the parking state. Accordingly, the parking lock inoperable condition of electric vehicle 1 may not be ignored.

In order to inhibit occurrence of such a parking lock inoperable condition, when low-voltage battery 9 is brought into a non-chargeable state due to a defect in high-voltage battery 4, motor controller 6 restricts a power output of electric motor 5 in accordance with reduction of the capacity (voltage V) of low-voltage battery 9 such that the vehicle speed VSP is controlled to an upper limit vehicle speed corresponding to the reduction of the voltage V of low-voltage battery 9. Thus, the driver of electric vehicle 1 is urged to stop electric vehicle 1 (automatic parking lock), thereby preventing electric vehicle 1 from coming into a parking lock inoperable condition (a parking inoperable condition).

For instance, when the voltage V of low-voltage battery 9 is reduced from 12V as a normal voltage to 11.5V, the power output of electric motor 5 is restricted such that the vehicle speed VSP is limited to 50 km/h.

When the voltage V of low-voltage battery 9 is reduced to 10V, the power output of electric motor 5 is restricted such that the vehicle speed VSP is limited to 20 km/h. When the voltage V of low-voltage battery 9 is reduced to below 9V, the power output of electric motor 5 is restricted to 0 such that the vehicle speed VSP is limited to 0 to thereby forcibly stop electric vehicle 1.

When electric vehicle 1 is stopped by the driver who has recognized abnormal condition of electric vehicle 1, or is forcibly stopped by cutting the power output of electric motor 5 in the absence of recognition of the abnormal condition by the driver, upon such restriction of the power output of electric motor 5 in accordance with reduction of the voltage of low-voltage battery 9, electric parking lock device 8 is operated to allow the driving wheels (front wheels 2) to automatically come into the parking lock state so that electric vehicle 1 can be prevented from coming into a parking lock inoperable condition (parking inoperable condition).

<Uncertified Battery Replacement Countermeasure>

In a case where high-voltage battery 4 is replaced with another high-voltage battery fully charged as indicated by arrow in FIG. 1 at a repair shop or a battery servicing station when the state of charge of high-voltage battery 4 is lowered, or in a case where high-voltage battery 4 is replaced with another high-voltage battery due to theft that occurs without being noticed during parking, if the high-voltage battery replaced (post-replacement high-voltage battery) is not a proper genuine high-voltage battery certified to electric vehicle 1 but a non-genuine high-voltage battery uncertified to electric vehicle 1, such a post-replacement high-voltage battery will be often improper to electric vehicle 1 in view of performance and physical property thereof.

Such an uncertified high-voltage battery applies an abnormal load to electrical components to which a power from the uncertified high-voltage battery is directly or indirectly supplied, peripheral relating parts of the electrical components, etc., thereby causing a malfunction thereof.

In such a case where high-voltage battery 4 is replaced with an uncertified high-voltage battery, it is necessary to allow the driver to recognize the fact and take countermeasure at an early stage. In addition, it is necessary to hereafter prevent the uncertified high-voltage battery from being used and suppress production of the uncertified high-voltage battery.

For the above reason, in this embodiment, motor controller 6 is configured to execute a control program as shown in FIG. 3 and take countermeasure against the case where high-voltage battery 4 is replaced with an uncertified high-voltage battery.

The control program shown in FIG. 3 is repeatedly executed during an operation of the travelling drive system which is started by turning on ignition switch 11. First, in step S11, it is judged whether or not it is the time immediately after ignition switch 11 is turned on (it is a first time at which ignition switch 11 is turned on).

When it is judged that it is the time immediately after ignition switch 11 is turned on, the logic flow proceeds to step S12 through step S15 in which it is judged whether or not high-voltage battery 4 is a genuine product certified to electric vehicle 1.

If it is the time immediately after high-voltage battery 4 is replaced with another high-voltage battery 4, it is judged whether or not the post-replacement high-voltage battery 4 as an object to be judged is a genuine product certified to electric vehicle 1.

Upon executing this judgment, first in step S12, an identification code (ID) specific to the post-replacement high-voltage battery 4 is read in and referred to a group of identification codes (ID) relative to the genuine high-voltage battery.

Next, in step S13, it is judged whether or not the identification code (ID) specific to the post-replacement high-voltage battery 4 is included in the group of identification codes (ID) relative to the genuine high-voltage battery, to thereby judge whether or not the post-replacement high-voltage battery 4 is the genuine product certified to electric vehicle 1.

When in step 13, it is judged that the identification code (ID) specific to the post-replacement high-voltage battery 4 is included in the group of identification codes (ID) relative to the genuine high-voltage battery, it is recognized that the post-replacement high-voltage battery 4 is the genuine product certified to electric vehicle 1. The logic flow proceeds to step S14. In step S14, the battery flag BFLAG is set to 1 indicating that the post-replacement high-voltage battery 4 is the genuine product certified.

However, when in step S13, it is judged that the identification code (ID) specific to the post-replacement high-voltage battery 4 is not included in the group of identification codes (ID) relative to the genuine high-voltage battery, or when the post-replacement high-voltage battery 4 does not have even any identification code (ID), it is recognized that the post-replacement high-voltage battery 4 is a non-genuine product uncertified to electric vehicle 1. The logic flow proceeds to step S15 in which the battery flag BFLAG is set to 0 indicating that the post-replacement high-voltage battery 4 is the non-genuine high-voltage battery uncertified.

Accordingly, step S13 to step S15 correspond to a battery propriety judgment means according to the present invention.

When in step S11, it is judged that it is not the time immediately after ignition switch 11 is turned on but a second or more time, the logic flow proceeds to step S16 through step S18 in which a power output control of electric motor 5 is executed as follows in accordance with the result of the above-described battery propriety judgment (battery flag BFLAG).

In step S16, it is judged whether or not the above-described battery flag BFLAG is 1, that is, whether the post-replacement high-voltage battery 4 is a genuine product certified to electric vehicle 1 or a non-genuine product uncertified to electric vehicle 1.

When it is judged that the battery flag BFLAG is 1 (that is, when it is judged that the post-replacement high-voltage battery 4 is a genuine product certified), the logic flow proceeds to step S17 in which the power output of electric motor 5 is controlled in a normal manner as explained above.

However, when it is judged that the battery flag BFLAG is 0 (that is, when it is judged that the post-replacement high-voltage battery 4 is a non-genuine product uncertified), the logic flow proceeds to step S18 in which the power output of electric motor 5 is restricted in a manner different from the above-described power output normal control.

The motor power output restriction in step S18 is carried out in order to allow the driver to recognize an abnormal condition that the post-replacement high-voltage battery 4 is a non-genuine product uncertified, and replace the post-replacement high-voltage battery 4 with a genuine product again at an early stage.

For instance, the above-described motor power output restriction configuration that is adopted when the voltage of low-voltage battery 9 is reduced to 10V due to a defect in high-voltage battery 4, is applied to restrict the power output of electric motor 5 such that the vehicle speed VSP is limited to 20 km/h while permitting driving of electric motor 5.

<Effects of Embodiment>

According to the above-described uncertified battery replacement countermeasure control of this embodiment, in a case where the post-replacement high-voltage battery 4 is a high-voltage battery uncertified to electric vehicle 1, the power output of electric motor 5 is restricted such that the vehicle speed VSP is controlled to 20 km/h while permitting driving of electric motor 5. Owing to the motor power output restriction, the driver of electric vehicle 1 can recognize an abnormal condition that the post-replacement high-voltage battery is an uncertified high-voltage battery immediately after starting travelling of electric vehicle 1.

However, even when the power output of electric motor 5 is restricted, driving of electric motor 5 is kept permitted so that electric vehicle 1 can attain self-propulsion at the vehicle speed VSP of not higher than 20 km/h under the above-described motor power output restriction.

Accordingly, it is possible to take countermeasure at early stage so as to bring electric vehicle 1 to a repair shop or a battery servicing station and replace the uncertified non-genuine high-voltage battery with a certified genuine high-voltage battery. As a result, it is possible to inhibit occurrence of a malfunction of electric vehicle 1 due to use of the uncertified non-genuine high-voltage battery for a long period of time. In addition, it is possible to avoid the problems such as time consuming and troublesome works upon displacing electric vehicle 1 by a wrecker and an increased cost.

Further, the driver of electric vehicle 1 can recognize that the post-replacement high-voltage battery is an uncertified high-voltage battery and can immediately replace the post-replacement high-voltage battery uncertified with a certified high-voltage battery. Therefore, it is possible to prohibit the use of the uncertified high-voltage battery and inhibit production of such an uncertified high-voltage battery.

Further, in this embodiment, upon judging propriety of high-voltage battery 4, it is judged whether the post-replacement high-voltage battery is a high-voltage battery certified to electric vehicle 1 or a high-voltage battery uncertified to electric vehicle 1 by referring an identification code (ID) assigned to an individual high-voltage battery to a predetermined identification code (ID). Thus, the judgment as to propriety of high-voltage battery 4 can be readily and instantaneously made in an advantageous manner by only checkup on the identification code (ID).

In addition, when the power output of electric motor 5 is restricted in a case where high-voltage battery 4 is replaced with an uncertified high-voltage battery, the above-described motor power output restriction configuration that is adopted when the voltage of low-voltage battery (parking lock power source) 9 is reduced to 10V due to a defect in high-voltage battery 4, is applied as such to restrict the power output of electric motor 5 such that the vehicle speed VSP is limited to 20 km/h.

Accordingly, it is not necessary to separately design a special control configuration, and the above predetermined object can be achieved by such a ready control as to apply an existing configuration of motor power output restriction without any change.

Further, upon restricting the power output of electric motor 5, the motor power output restriction is carried out such that the vehicle speed VSP is limited to 20 km/h.

As a result, the driver is alerted of replacement with an uncertified high-voltage battery by restriction of the vehicle speed which makes the driver most sensitive to an abnormal condition. Therefore, the driver is allowed to more certainly recognize this event, and the above effects can be more remarkably attained.

The invention claimed is:

1. An uncertified battery replacement countermeasure apparatus for an electric vehicle including an electric motor as at least a part of a power source which is driven by an electric power from a replaceable battery, in which the electric vehicle comprises an electric auxiliary equipment that is actuated by an auxiliary power source provided separately from the battery, the auxiliary power source being charged with an electric power from the battery, and when the auxiliary power source is in a non-chargeable state, the power output of the power source is restricted in accordance with a reduction of a capacity of the auxiliary power source, the uncertified battery replacement countermeasure apparatus comprising:

A controller comprising a battery propriety judgment section configured to judge whether a post-replacement battery is a battery certified to the electric vehicle or a battery uncertified to the electric vehicle; and a power output restricting section configured to restrict a power output of the power source while permitting driving of the power source when it is judged that the post-replacement battery is the battery uncertified to the electric vehicle by the battery propriety judgment section, wherein the power output restricting section is configured to apply a specific configuration of power source output restriction corresponding to the reduction of a capacity of the auxiliary power source among configurations of power source output restriction corresponding to the reduction of capacity of the auxiliary power source.

2. The uncertified battery replacement countermeasure apparatus for an electric vehicle as claimed in claim 1, wherein the battery propriety judgment section is configured to judge whether the post-replacement battery is the battery certified to the electric vehicle or the battery uncertified to the electric vehicle by referring an identification code attached to an individual battery to a predetermined identification code.

3. The uncertified battery replacement countermeasure apparatus for an electric vehicle as claimed in claim 2, wherein the power output restricting section is configured to execute the output restriction such that a ground speed of the electric vehicle is suppressed.

4. The uncertified battery replacement countermeasure apparatus for an electric vehicle as claimed in claim 1, wherein the power output restricting section is configured to execute the output restriction such that a ground speed of the electric vehicle is suppressed.

5. The uncertified battery replacement countermeasure apparatus for an electric vehicle as claimed in claim 4, in which the electric vehicle comprises an electric auxiliary equipment that is actuated by an auxiliary power source provided separately from the battery, the auxiliary power source being charged with an electric power from the battery, and when the battery is in a defective condition, the ground speed of the electric vehicle is restricted in accordance with a reduction of a capacity of the auxiliary power source, wherein the power output restricting section is configured to apply a specific configuration of ground speed restriction corresponding to the reduction of a capacity of the auxiliary power source among configurations of ground speed restriction corresponding to the reduction of capacity of the auxiliary power source.

6. An uncertified battery replacement countermeasure apparatus for an electric vehicle including an electric motor as at least a part of a power source which is driven by an electric power from a replaceable battery, in which the electric vehicle comprises an electric auxiliary equipment that is actuated by an auxiliary power source provided separately from the battery, the auxiliary power source being charged with an electric power from the battery, and when the auxiliary power source is in a non-chargeable state, the power output of the power source is restricted in accordance with a reduction of a capacity of the auxiliary power source, the uncertified battery replacement countermeasure apparatus comprising:

a controller configured to:

judge whether a post-replacement battery is a battery certified to the electric vehicle or a battery uncertified to the electric vehicle;

restrict a power output of the power source while permitting driving of the power source when it is judged that the post-replacement battery is the battery uncertified to the electric vehicle; and apply a specific configuration of power source output restriction corresponding to the reduction of a capacity of the auxiliary power source among configurations of power source output restriction corresponding to the reduction of capacity of the auxiliary power source.

* * * * *